(12) United States Patent
LaManna et al.

(10) Patent No.: US 11,444,946 B2
(45) Date of Patent: Sep. 13, 2022

(54) SOCIAL MEDIA CONTENT MANAGEMENT SERVER SYSTEM

(71) Applicant: Vydia, Inc., Holmdel, NJ (US)

(72) Inventors: Roy Christopher LaManna, Freehold, NJ (US); Mark Ivan Allen, Westfield, NJ (US); Stephen Mark Potter, Metuchen, NJ (US); Nicholas Edward Bobryk, Red Bank, NJ (US); Murty V. Korada, East Windsor, NJ (US); Daniel Robert Vassallo, Red Bank, NJ (US); Brittany Lynn Jacobs, Morganville, NJ (US); Matthew Thomas Vincek, Aberdeen, NJ (US); Ning Ding, Aberdeen, NJ (US); Paul Michael Arevalo Santos, Newton, NJ (US); Tyler Alexander Geerdts, Red Bank, NJ (US); Bhavani Veeraputhiran Saminathan Ramasamy, Edison, NJ (US); Ricardo Saporta, Neptune City, NJ (US)

(73) Assignee: VYDIA, INC., Holmdel, NJ (US)

( * ) Notice: Subject to any disclaimer, the term of this patent is extended or adjusted under 35 U.S.C. 154(b) by 0 days.

(21) Appl. No.: 16/374,528

(22) Filed: Apr. 3, 2019

(65) Prior Publication Data
US 2019/0306167 A1 Oct. 3, 2019

Related U.S. Application Data

(60) Provisional application No. 62/651,790, filed on Apr. 3, 2018.

(51) Int. Cl.
*H04L 9/40* (2022.01)
*G06Q 50/00* (2012.01)

(52) U.S. Cl.
CPC ............. *H04L 63/10* (2013.01); *G06Q 50/01* (2013.01)

(58) Field of Classification Search
CPC ............................... H04L 63/10; G06Q 50/01
See application file for complete search history.

(56) References Cited

U.S. PATENT DOCUMENTS

| 8,688,999 B2 | 4/2014 | Conwell |
| 2006/0248573 A1 | 11/2006 | Pannu et al. |

(Continued)

FOREIGN PATENT DOCUMENTS

| WO | 2011/011398 A2 | 1/2011 |
| WO | 2014031283 A1 | 2/2014 |

OTHER PUBLICATIONS

International Search Report and Written Opinion for International Application No. PCT/US2019/025624, dated Jul. 18, 2019, 10 pages.

(Continued)

*Primary Examiner* — Oleg Korsak
(74) *Attorney, Agent, or Firm* — Greenberg Traurig, LLP

(57) ABSTRACT

Embodiments of the invention include a server system with a processor, and a non-transitory computer-readable storage medium in data communication with the processor that can store and exchange content data including or representing content derived or received from a server of a social network and/or a user. An application programming interface includes steps executable by the processor to upload, download, or enable access of the content data. A content rights synchronization process is configured to enable the user to assign and/or control a rights access to any of the content data associated with the user. Further, a content engine can monitor for and save the content data as received content when identified, accessed, and/or received by the network. The content metadata and/or the content data is stored for (Continued)

recall in a centralized library database, where rights access is assigned by the at least one user.

19 Claims, 11 Drawing Sheets

(56) References Cited

U.S. PATENT DOCUMENTS

| | | | | |
|---|---|---|---|---|
| 2009/0144392 | A1* | 6/2009 | Wang | G06Q 10/10 709/217 |
| 2009/0157560 | A1* | 6/2009 | Carter | G06Q 50/188 705/80 |
| 2011/0320550 | A1* | 12/2011 | Lawson | H04L 51/32 709/206 |
| 2012/0254303 | A1* | 10/2012 | Anbalagan | G06Q 30/0645 709/204 |
| 2012/0254304 | A1* | 10/2012 | Anbalagan | G06Q 30/06 709/204 |
| 2012/0324121 | A1 | 12/2012 | Carr et al. | |
| 2013/0198811 | A1* | 8/2013 | Yu | G06Q 50/01 726/4 |
| 2013/0232189 | A1 | 9/2013 | Lewis et al. | |
| 2014/0046955 | A1* | 2/2014 | Dollard | G06F 16/951 707/748 |
| 2014/0075004 | A1* | 3/2014 | Van Dusen | G06F 16/90335 709/223 |
| 2014/0297655 | A1 | 10/2014 | Paglia et al. | |
| 2014/0359009 | A1 | 12/2014 | Shih et al. | |
| 2015/0058104 | A1* | 2/2015 | Marchese | G06Q 20/10 705/14.16 |
| 2015/0373116 | A1 | 12/2015 | Mo et al. | |
| 2016/0171542 | A1* | 6/2016 | Fanous | G06Q 30/0256 705/14.54 |
| 2017/0169522 | A1 | 6/2017 | Hyman et al. | |

OTHER PUBLICATIONS

International Search Report and Written Opinion for International Application No. PCT/US2018/025927, dated Jan. 4, 2019, 7 pages.

* cited by examiner

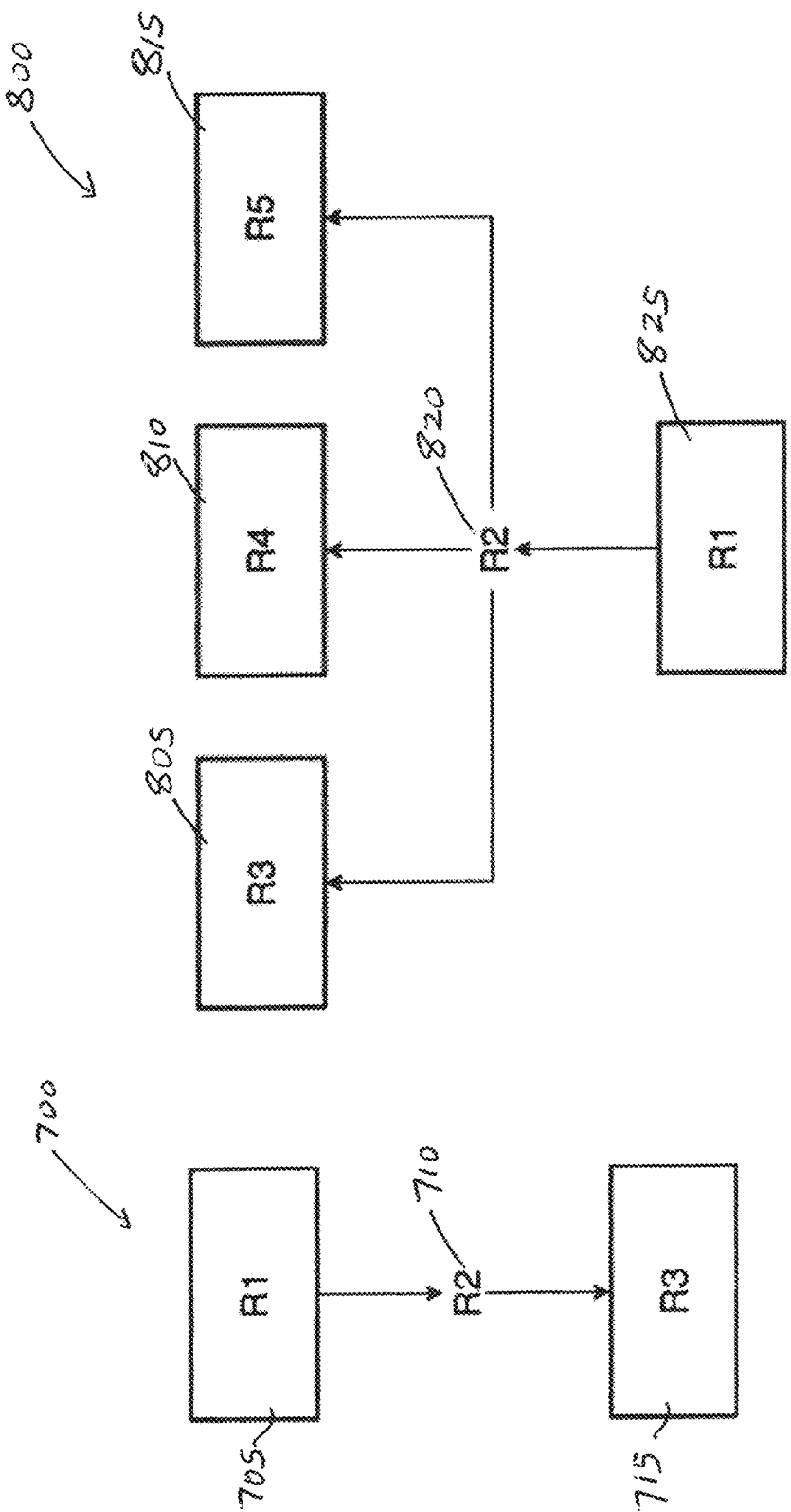

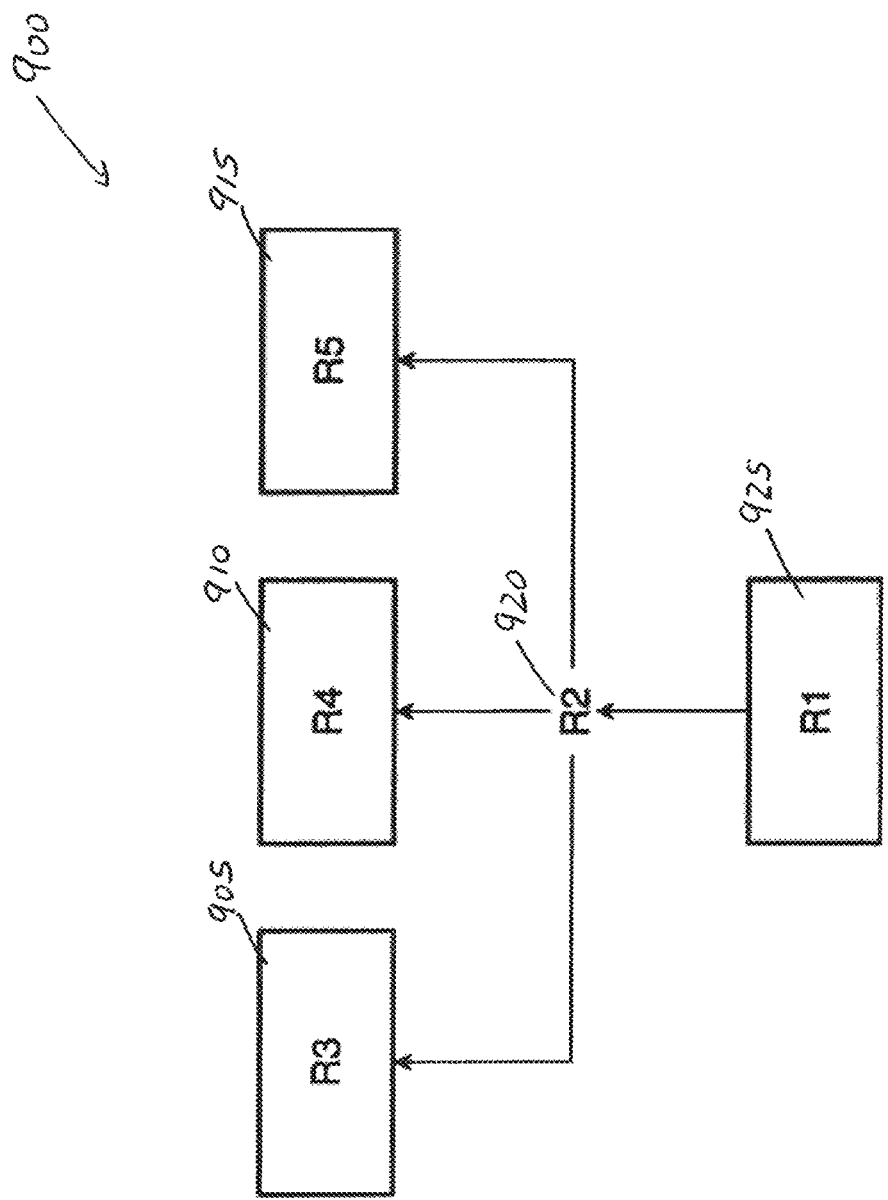

SOCIAL MEDIA CONTENT MANAGEMENT SERVER SYSTEM

CROSS-REFERENCE TO RELATED APPLICATIONS

This application claims the benefit of and priority to U.S. Provisional Patent Application No. 62/651,790, filed Apr. 3, 2018, entitled SOCIAL MEDIA CONTENT MANAGEMENT, the entire contents of which are incorporated herein by reference.

BACKGROUND

Social media networks provide users with a myriad of options to upload and selectively publish or distribute various content including video files, images files, graphics files, text files, audio files, emails, and instant messages. As the global Internet continues to evolve, many users now utilize multiple social media networks or other platforms to create, view, store, and distribute their content. As the user's palette of content continues to expand, they are often faced with the challenge of efficient content management. Users generally find they can easily lose track of and/or ineffectively manage their content, either because they do not have a record of where the content is located, or are required to search across multiple platforms. Content creators often face the challenge of securing protection rights to ensure their content is distributed or used based on set policies or terms. Securing protection can prevent pirates from illegally stealing, distributing, and monetizing the content without creator and/or user permissions.

SUMMARY

A server system comprising at least one processor, and at least one non-transitory computer-readable storage medium in data communication with the at least one processor that is configured to store and exchange content data comprising or representing content derived or received from at least one server of at least one social network and/or at least one user. Some embodiments include an application programming interface in data communication with the at least one processor and the at least one non-transitory computer-readable storage medium. In some embodiments, the application programming interface includes steps executable by the at least one processor to upload, download, or enable access of the content data derived or received from the at least one server of at least one social network and/or at least one user. Some embodiments include at least one content rights synchronization process configured to enable the at least one user to assign and/or control a rights access to any of the content data associated with the at least one user. Some embodiments include a content engine configured to monitor for the content data and save the content data as received content when identified, accessed, and/or received by the at least one social network. In some embodiments, the content data comprises content metadata, and/or the content metadata and/or the content data being stored for recall in a centralized library database, where the recall is based on the rights access assigned by the at least one user.

In some embodiments, the content comprises new content data not previously accessed or received by the at least one server, or current content of the at least one server, or old content previously accessed or received by the at least one server, and/or archived content. In some embodiments, the content comprises one or more video data files or information, and/or one or more still image data files or information, and/or one or more graphic data files or information, and/or one or more text data files or information, and/or one or more sound data files or information, and/or one or more voice data files or information, and/or one or more control code data files or information.

In some embodiments, the content engine is configured to automatically copy at least some of the content data to the centralized library database substantially immediately after the content data is posted by the at least one social network and/or at least one user. In some embodiments, the copying of at least some of the content data is enabled by the at least one user controlling an opt-in and authorization of the system to access the content data from the at least one social network as part of the rights access. In some embodiments, the content engine is configured to copy at least some of the content data by responding to at least one message from the at least one social network.

In some embodiments, the application programming interface is configured and arranged to be in data communication with the at least one content capturing device. In some further embodiments, the at least one content capturing device comprises at least one or more cameras or sensors configured for capturing one or more images or video files. In some embodiments, the at least one content engine is configured to save the content data following content being identified by the at least one social network with at least one of webhooks and polling.

Some embodiments include a web server configured to listen for one or more messages from the at least one social network, where the one or more messages specify when content has been uploaded to at least one social network account of the at least one user. In some embodiments, the one or more messages comprise a content uniform resource locator (URL), and the web server is configured to use the content uniform resource locator (URL) to locate and download the content data from the least one social network.

In some embodiments, the application programming interface is configured and arranged to provide a unified view of at least some of the content data to the at least one user. In some embodiments, the polling comprises the content engine periodically checking for content newly uploaded to the at least one social network. In some embodiments, in response to the polling, the at least one social network provides information about the content data, information about when the content data was posted, content metadata, and/or a content uniform resource locator (URL).

In some embodiments, the at least one content rights synchronization process is configured to enable the at least one user to set one or more default protection policies of any content data. In some embodiments, the one or more default protection policies comprise policies to monetize, permit, and/or block 3rd party uploads of content owned or associated with the at least one user.

In some embodiments, upon import of unprotected content data, the at least one content rights synchronization process automatically asserts rights and policies on 3rd party platforms. In some further embodiments, the at least one content rights synchronization process is configured to apply a unique identifier to content on one or more 3rd party platforms and/or at least one of the social networks enabling earnings from monetization of content associated with the at least one user to pass into the server system and automatically paid to the at least one user.

Some embodiments of the invention can automatically identify protectable content downloaded through social synchronization, and send content reference files, ownership information, and content metadata to all monetizable networks on behalf of the at least one user. In some embodiments, one or more default protection policies of any content data can be set based on the file and metadata of the content data including at least one of file type data, file length data, content title data, content category data, and International Standard Recording Code data.

DESCRIPTION OF THE DRAWINGS

FIG. 7 illustrates an unprotected content process in accordance with some embodiments of the invention.

FIG. 8 illustrates a content distribution process in accordance with some embodiments of the invention.

FIG. 9 illustrates a rights assertion and policies process in accordance with some embodiments of the invention.

DETAILED DESCRIPTION

Figure 1A:
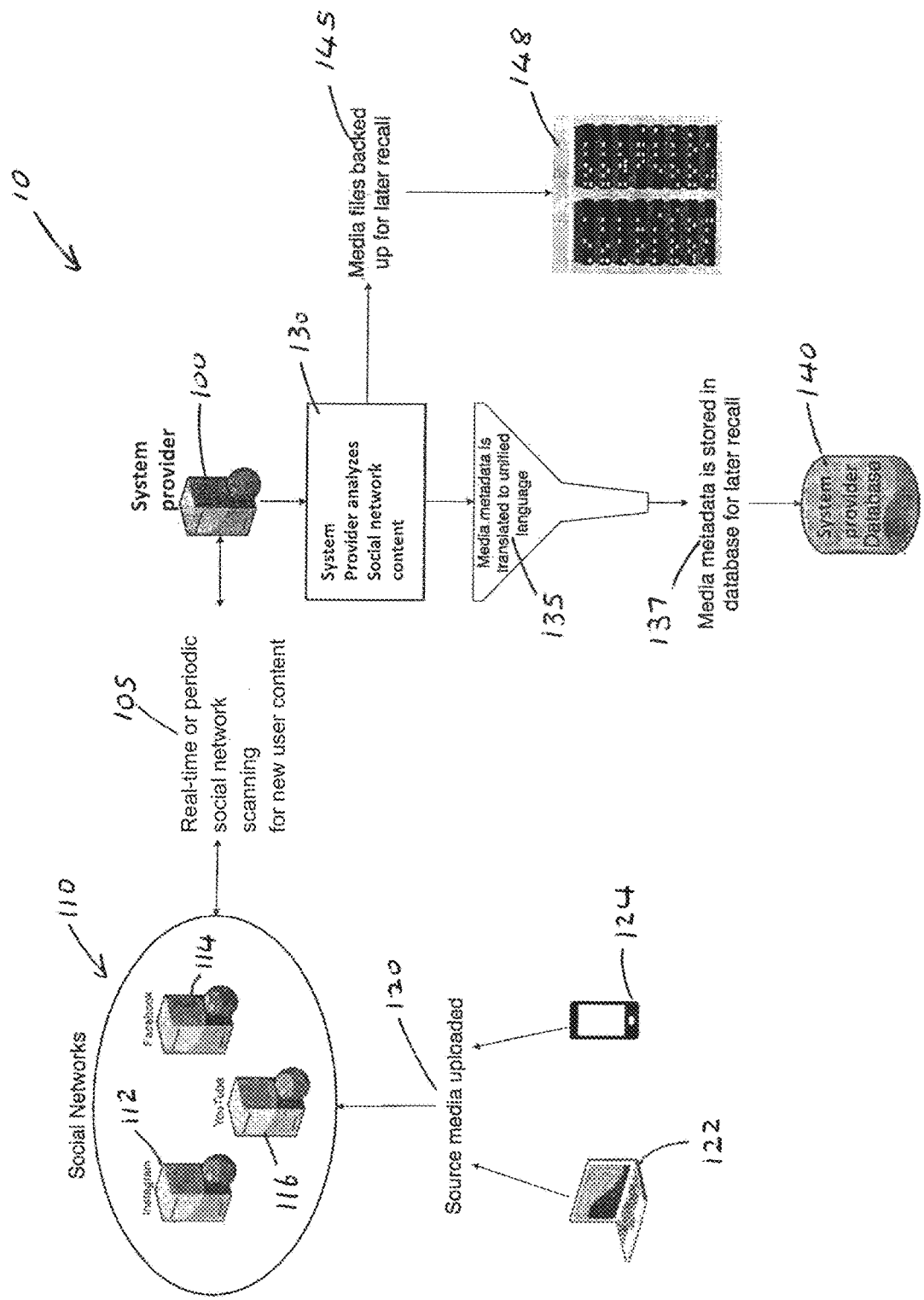
FIG. 1A illustrates a content control server system architecture in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

As used herein, the term "content" can include, but not be limited to, one or more media files including video files or information, and/or one or more still image files or information, and/or one or more graphic files or information, and/or one or more text file files or information, and/or one or more sound files or information, and/or one or more voice files or information, and/or one or more control code files or information, or any combination thereof. In some embodiments, the control code content can include code or instructions to control one or more applications to create or process one or more media files including, but not limited to, video content, and/or still image content, and/or graphic file content, and/or text file content, and/or sound content, and/or voice content, and/or control code content or any combination thereof. In some embodiments, the content can comprise one or more communications via instant messaging including, but not limited to, instant text messaging, and/or instant graphical messaging, and/or instant image message, and/or instant video messaging, and/or instant audio or voice messaging, and combinations thereof. In some embodiments, the content can be new content, such as content not previously accessed and/or uploaded. In other embodiments, the content can be old or previously accessed or loaded content.

As used herein, a "user" can be a single user or a plurality of users. Further, a user can be defined as a member of the public, and/or the creator, and/or a consumer, and/or a customer, and/or a client, or an entity such as a limited liability company. Other user types can include, but not be limited to, an administrative user and/or a server system user.

As used herein, "policies" determine the actions a third-party platform will take related to a user's copyrighted assets. A "Permit" policy allows other users on the platform selected to publish content containing the copyrighted asset(s) and will track performance metrics. A "Monetize" policy authorizes advertisement(s) to be served with content a user owns, enabling the copyright owner to earn a percentage of the advertising revenue. A "Block" policy prevents 3rd parties from uploading content containing the copyrighted asset(s). "No Policy" does not set any of the previously defined policies on social platforms.

It is recognized in the disclosure herein that the configuration of numerous aspects of content management in the Internet, including, but not limited to social media networks, creates a technical problem for users of Internet systems and services, since proper or desired management and control is otherwise difficult without significant manual effort, or in some cases not possible by manual effort. Some embodiments of the invention provide a technological solution to improve the content management, including any related systems and computing devices/servers by providing automated functionality that effectively and more efficiently manages content, control and distribution (including management and storing of content, configuration data, and metadata of the user) in ways that cannot effectively be done manually. As such, the embodiments described herein recite non-conventional approaches for content management using systems and methods that are not well-known, and further are not taught or suggested by known conventional methods or systems. Moreover, the specific functional features are a significant technological improvement over conventional methods and systems, including at least the operation and functioning of a computing system that are technological improvements. This technological improvement includes the one or more aspects of the systems and method described herein that describe the specifics of how a machine operates, which the Federal Circuit makes clear is the essence of statutory subject matter.

One or more of the embodiments described herein including functional limitations that cooperate in an ordered combination to transform the operation of a data repository in a way that improves the problem of data storage and updating of databases that previously existed. In particular, some embodiments described herein include a server system and methods for managing single or multiple content items across disparate sources or applications that creates a problem for users of such systems and services, and that maintaining reliable control over distributed information is difficult or impossible without significant effort.

As used herein, a social network or networks can be a network of interactions, communications, and/or relationships. The social network or networks can comprise a website or other application which enables or facilitates users to communicate with each other by entering or uploading content such as comments, messages, videos, images, etc.

The description herein further describes some embodiments that provide novel features that improve the performance of communication and software, systems and servers by providing automated functionality that effectively and more efficiently manages content data for a user in a way that cannot effectively be done manually. Therefore, the person of ordinary skill can easily recognize that these functions provide the automated functionality, as described herein, in a manner that is not well-known and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments include a server system that collects and unifies a user's content and associated metadata across many social networks to one location by automatically copying that content from those networks into a centralized library immediately or soon after the content is posted. In some embodiments, the server system can be enabled by user opt-in and authorization of the server system to access content files from each respective social network on the user's behalf.

In some embodiments of the invention, the server system can utilize a unique polling and a webhook server system that can communicate with different social network application or application programming interface (API), and gather content, metadata, and rights from those platforms. In some embodiments, the server system can automatically prevent duplicate information, translate the data from the social networks into a unified language, and save the data in a centralized database. In some embodiments, the server system can synchronize content from social networks using a unique system of polls and webhooks that that can communicate with different APIs and systems on these networks. For example, FIG. 1A illustrates a content control server system architecture 10 in accordance with some embodiments of the invention. In some embodiments, any content can be added or introduced to a social network 110 and/or the server system 100 using any conventional user device by a user 120. For example, in some embodiments, the user 120 can engage a social network 110 using a desktop computer 122, and/or laptop computers, or any fixed, generally non-mobile Internet appliances coupled through the Internet. In some further embodiments, the user can comprise a mobile user engaging the platform. In some embodiments, the user 120 can couple to a network using any mobile computing device 124 that can be wirelessly coupled to the Internet, including, but not limited to, personal digital assistants, and/or cellular phones, mobile phones, or smart phones, and/or pagers, and/or digital tablets, and/or fixed or mobile Internet appliances. In some embodiments, one or more components of the network 110 can include numerous user devices which can be personal computers including for example desktop computers, laptop computers, digital assistants, personal digital assistants, cellular phones, mobile phones, smart phones, pagers, digital tablets, Internet appliances, and other processor-based devices. In other embodiments of the invention, one or more components of the network 110 can include numerous user devices that include virtual reality viewing devices such as virtual reality headsets, virtual reality glasses, and the like.

Some embodiments include one or more coupled devices and systems for information capture, including images that can be still images and/or moving images. Further, in some embodiments, any of the coupled devices or systems can communicate content data and information from or to another coupled device or system using at least one API. In some embodiments, the API can couple to one or more cameras or other sensors for capturing images or other information (including one or more images or videos). In some embodiments, at least some content data can comprise visual data received from or taken from the user (e.g., such as an image or video). In some other embodiments, the data can comprise data measured or taken from the user's body, including, but not limited to, at least one body or physical appearance image (e.g., such as a facial image), at least one object worn or carried by the user, and/or at least one gesture, and/or at least one portion of an environment of surrounding the user. In some embodiments, the one or more coupled devices and systems for information capture can comprise desktop computer 122, and/or mobile computing device 124.

In some non-limiting embodiments of the invention, the server system 100 can couple to any conventional social network API. For example, in some embodiments, the server system 100 can couple through a social network API to one or more files of the social network site, including, but not limited to image files, HTML files, JavaScript files, and/or CSS files. In some embodiments, the server system 100 can scan for, access or update content 105 to or from one or more social networks 110 with information including, but not limited to, text files, graphic files, audio files, and/or video files, and/or instant text messaging files, and/or instant graphical messaging files, and/or instant image message files, and/or instant video messaging files, instant audio or voice messaging files, and combinations thereof. For example, in some non-limiting embodiments of the invention, the server system 100 can scan for content 105 and couple to one or more Instagram® accounts or webpages 112, and/or one or more Facebook® accounts or webpages 114, and/or one or more YouTube® accounts, channels or webpages. In some other non-limiting embodiments of the invention, the server system 100 can scan for content 105 and couple to one or more TWITTER® API accounts or webpages. In some further non-limiting embodiments of the invention, the server system 100 can scan for content 105 and couple to any other conventional social network account, or any other Internet-enabled system or account. In some embodiments, the scan for content 105 can be substantially in real-time, or periodic.

Instagram® (Instagram is a registered trademark of Instagram, LLC). TWITTER® is a registered trademark of Twitter, Inc., San Francisco Calif. FACEBOOK® is a registered trademark of Facebook, Inc., Palo Alto Calif. "YouTube®" and the "YouTube Logo®" are registered trademarks of Google Inc.

In some embodiments of the invention, after the collection, deduplication, and unification processes are complete, the content and associated metadata can be made available to the user 120 in a centralized library. This allows the user to view their content and metadata from multiple social networks in one place, and further allows the user 120 to perform other actions with said content, such as monetizing their content, or publishing it to one or more 3rd party networks. In some embodiments, the server system 100 can perform an analysis 130 of content 105, and any media or content files can be back-up for later recall 145 in storage 148. Further, in some embodiments, content metadata can be translated to unified language 135, and stored for later recall 137 on a database 140.

Some embodiments include methods to retrieve content 105 based on the social network being accessed, including, but not limited to, webhooks and polling. A webhook is a method of augmenting the behavior of a web application with custom callbacks. In some embodiments of the invention, when a social network receives content from a user 120 who has granted server system 100 account access, the social network can automatically notify the server system 100 of the content. In some embodiments, the server system 100 servers can be configured to monitor or listen for and identify any content. In some embodiments, the server system 100 servers can be configured to save any content when it is identified, accessed, and/or received.

Figure 1B:
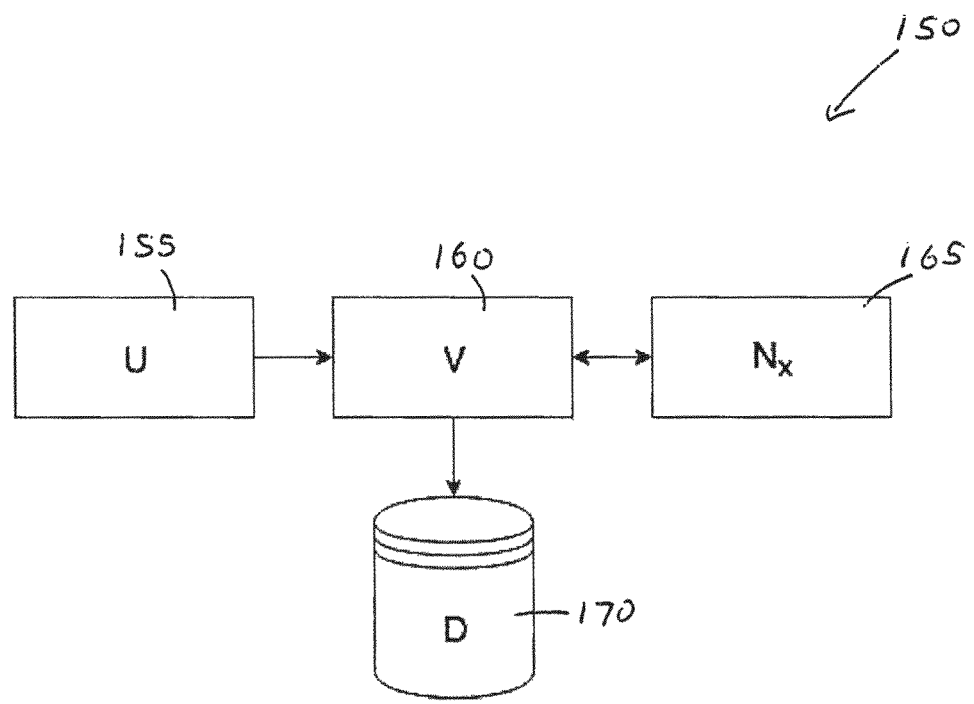
FIG. 1B illustrates a method of authorizing the server system application to access all content on a user's social network account in accordance with some embodiments of the invention.

FIG. 1B illustrates a method 150 of authorizing server system 100 (via system application 160) to access all content on a user's social network account 165. In some embodiments, the user 155 can authorize the system application 160 to access all the user's content on a user's social network account 165 on their behalf. In some embodiments, the server system 100 can send the user's authorization to the social network 110 by translating that authorization to the API language that the social network 110 uses, and the social network 110 can send the authorization token for that user 155 back to server system 100. In some embodiments, the system application 160 of the server system 100 can store this authorization token for that social network in a database 170. In some embodiments, this authorization token can be used to allow the server system 100 to communicate with the social network 110 on the user's behalf.

Figure 1C:
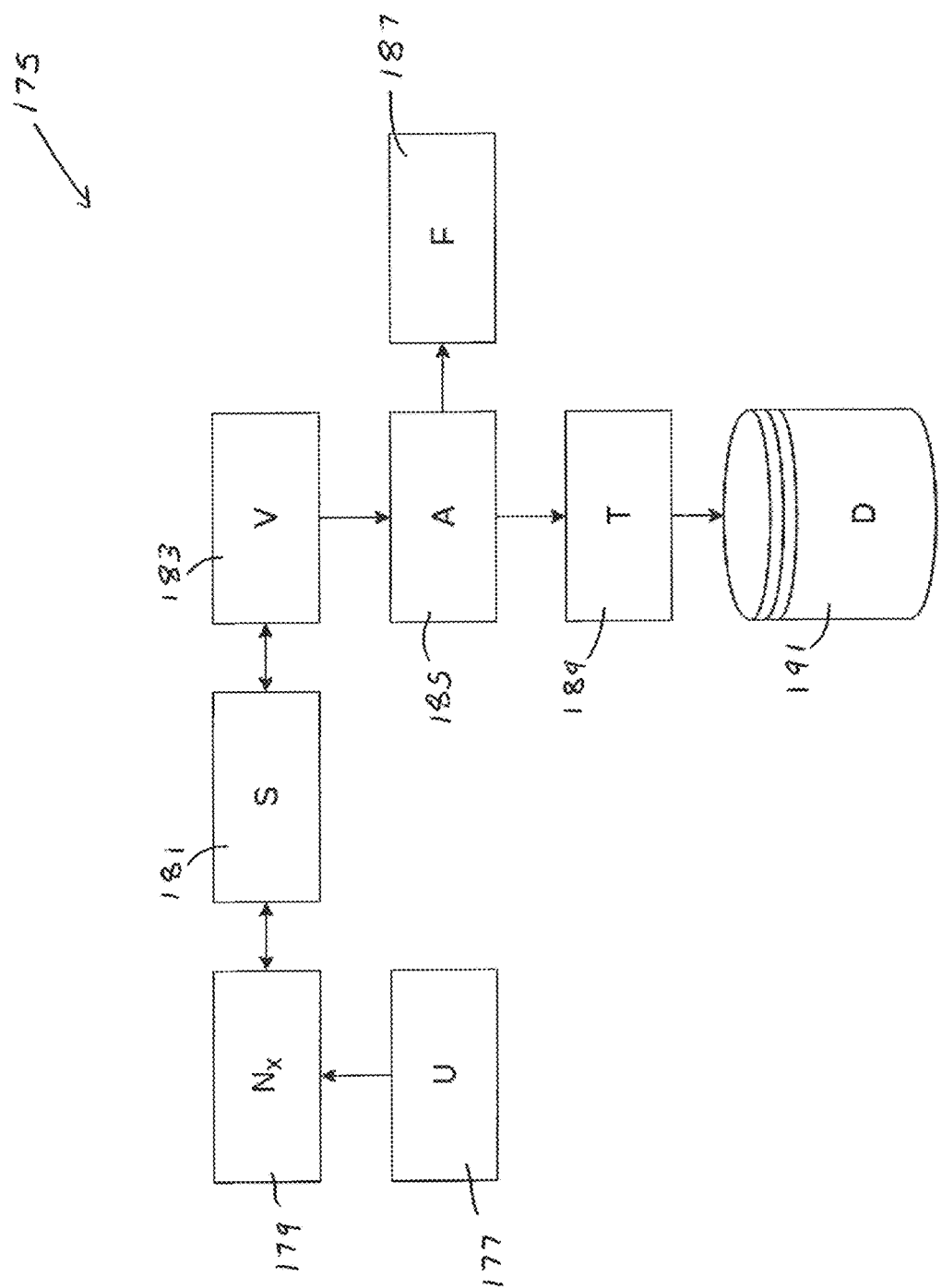
FIG. 1C illustrates a server system and method of synchronizing the content of many social networks with the server system in accordance with some embodiments of the invention.

FIG. 1C illustrates a server system and method 175 of synchronizing the content of many social networks with the server system 100 in accordance with some embodiments of the invention. For example, in some embodiments, a user 177 can upload their content to the social network 179. In some embodiments, a system application 183 of server system 100 can utilize a process of synchronization 181 to communicate with the social network 179. In some embodiments, based on a social network API, the system application 183 can utilize a combination of polling and webhooks to synchronize data from the social network 179 to the server system 100.

In some embodiments, the server system 100 can analyze the content and data sent from the social network (shown as analysis 185). In some embodiments, duplicates are prevented, and content can be categorized based on content type and source. Further, in some embodiments, the content file can be downloaded to file storage 187, and metadata can be translated through process 189 and saved in the database 191. In some embodiments, the translation process can assess each item of metadata, and save that metadata item in the database. Further, in some embodiments, regardless of origin, all of the metadata items are unified under one internal schema.

Some non-limiting embodiments utilizing the above described webhooks are described. In some embodiments, a system web server can listen for new messages from various social networks (such as social network 110). In some embodiments, the messages from these social networks specify when content is uploaded to their social account (e.g., via a message). In some embodiments, these content messages can contain information about the content including content metadata and a content URL. In one non-limiting embodiment, the server system 100 can use the content URL to download the content file from the social network 110 and upload to a cloud storage of the server system 100. In some embodiments, the server system 100 can add the supplied metadata to the database and associate it to a user (such as user 120). Further, in some embodiments, synchronized content from various social network sources can be displayed to the user in a unified view in the content control server system architecture 10.

FIGS. 2-5 illustrates webhook process flows executable by the content control server system architecture 10 of FIG. 1A in accordance with some embodiments of the invention. In some embodiments of the invention, one or more webhook steps can include the server system 100 listening for new messages from various social networks. In some embodiments, these messages can specify when content is uploaded to one or more social network accounts. In some embodiments, content messages can contain information regarding uploaded content including content metadata and a content URL. In some embodiments of the invention, the server system 100 can utilize content URLs to download content files from the social network and upload content files to server system 100 cloud storage. In some further embodiments, the server system 100 can add the supplied metadata to the database and associate it with a user. In other embodiments, the server system 100 can synchronize content from various social network sources displayed to the user in a unified view on the content control server system architecture 10.

Figure 2:
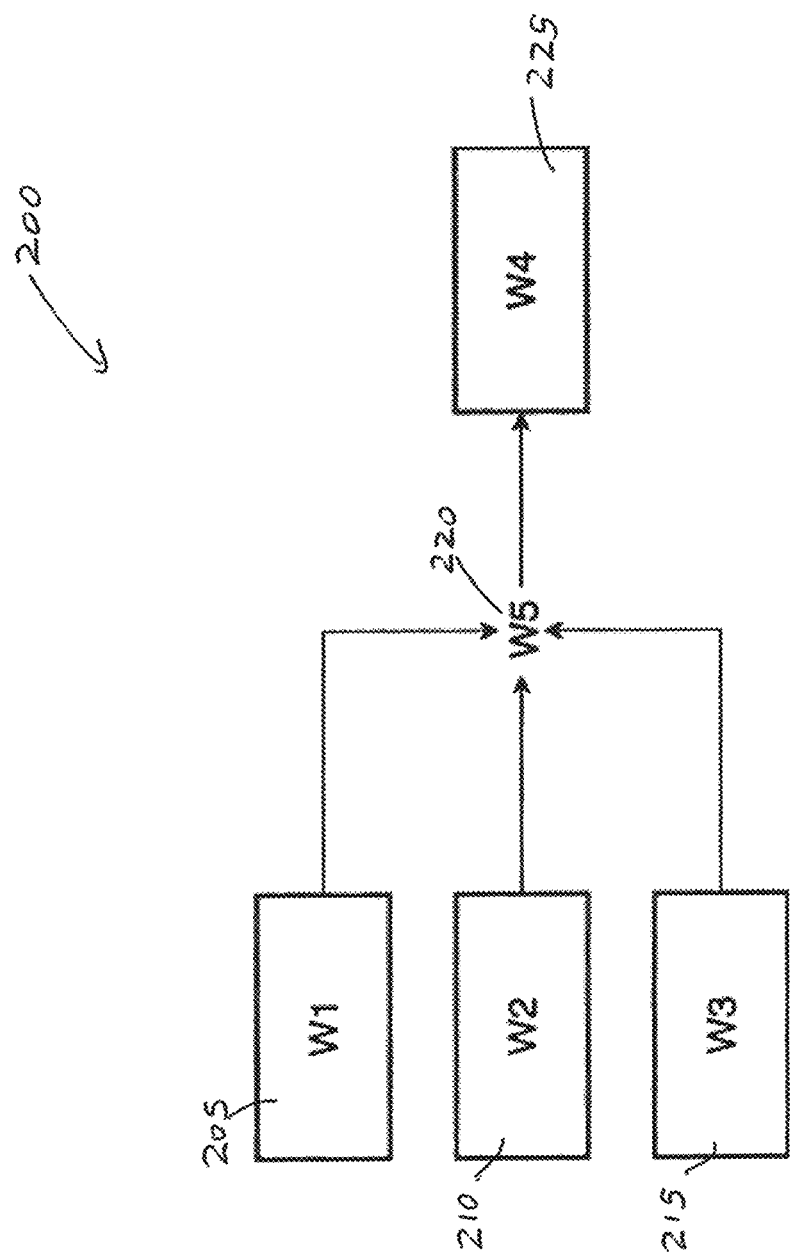
FIGS. 2-5 illustrate webhook process flows executable by the content control server system architecture of FIG. 1A in accordance with some embodiments of the invention.

Referring to the process flow of FIG. 2, illustrating webhook process 200, in some embodiments, item "W1" 205 can comprise a social network server, and/or item "W2" 210 can comprise a social network server, and/or item "W3" 215 can comprise social network server, and/or item "W4" 225 can comprise a server system 100 server (such as the server system 100) that can be coupled to the social network servers "W1" 205, "W2" 210, and "W3" 215. In one non-limiting embodiment, the social networks 110 can comprise the social network servers "W1" 205, "W2" 210, and "W3" 215. In some embodiments, the "W5" 220 can include messages from one or more of the social networks (e.g., from any one or more of the social network servers "W1" 205, "W2" 210, and "W3" 215), and can specify when any content is uploaded to a user's social network account (e.g., users 120). In some embodiments, the messages for content can contain information about the content, including, without limitation, content metadata and/or a content URL for the file's location on the social network's server.

Figure 3:
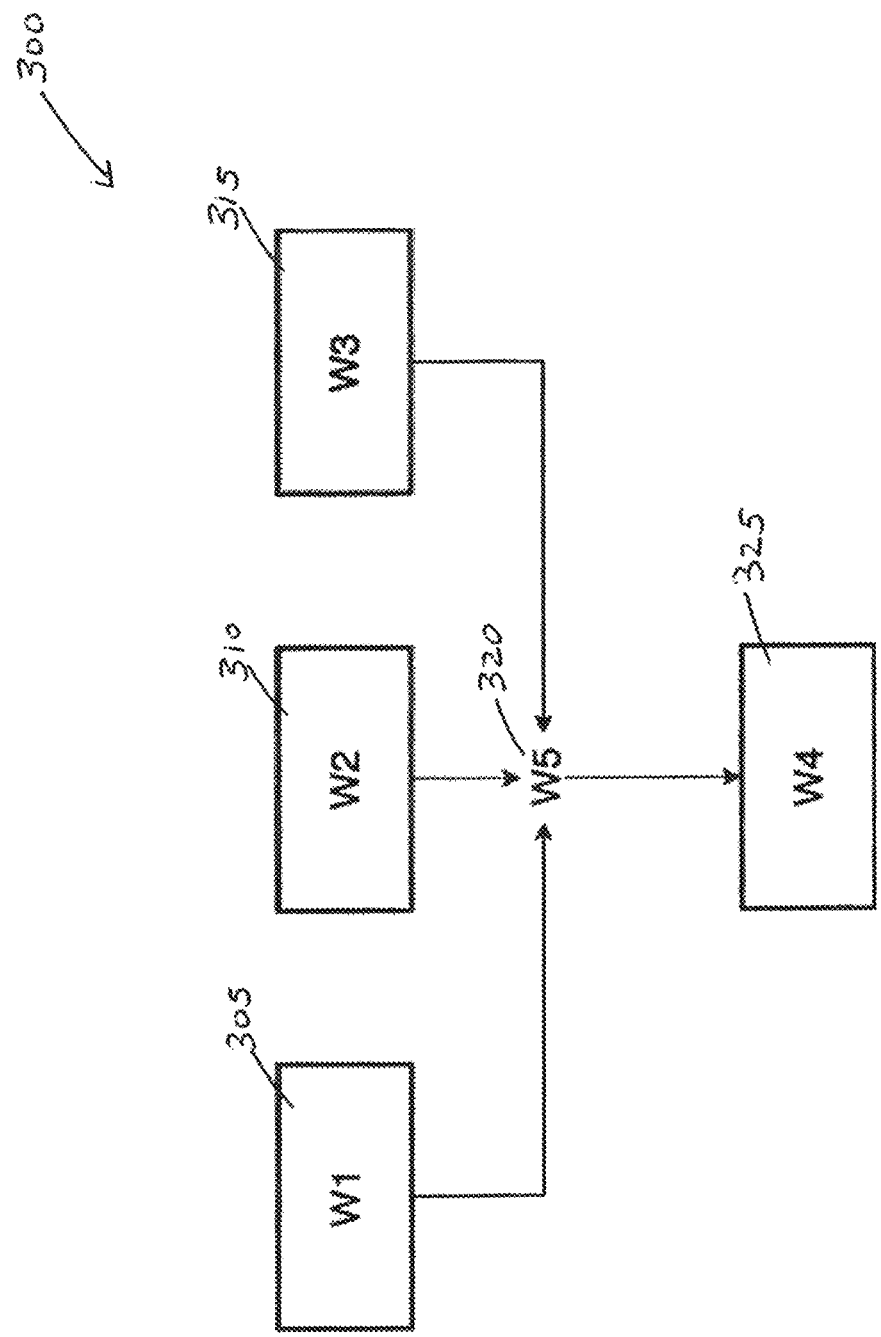

Referring to the process flow of FIG. 3, illustrating webhook process 300 executable by the content control server system architecture 10 of FIG. 1A, in some embodiments, a server system 100 can use the content URL to download the content file from the social networks to a server system 100 file storage. For example, item "W1" 305, item "W2" 310, and/or item "W3" 315 can comprise social network file storage, and item "W5" 320 can comprise content files that are downloaded from various social networks to a server system 100 file storage "W4" 325 (e.g., database 140).

Figure 4:
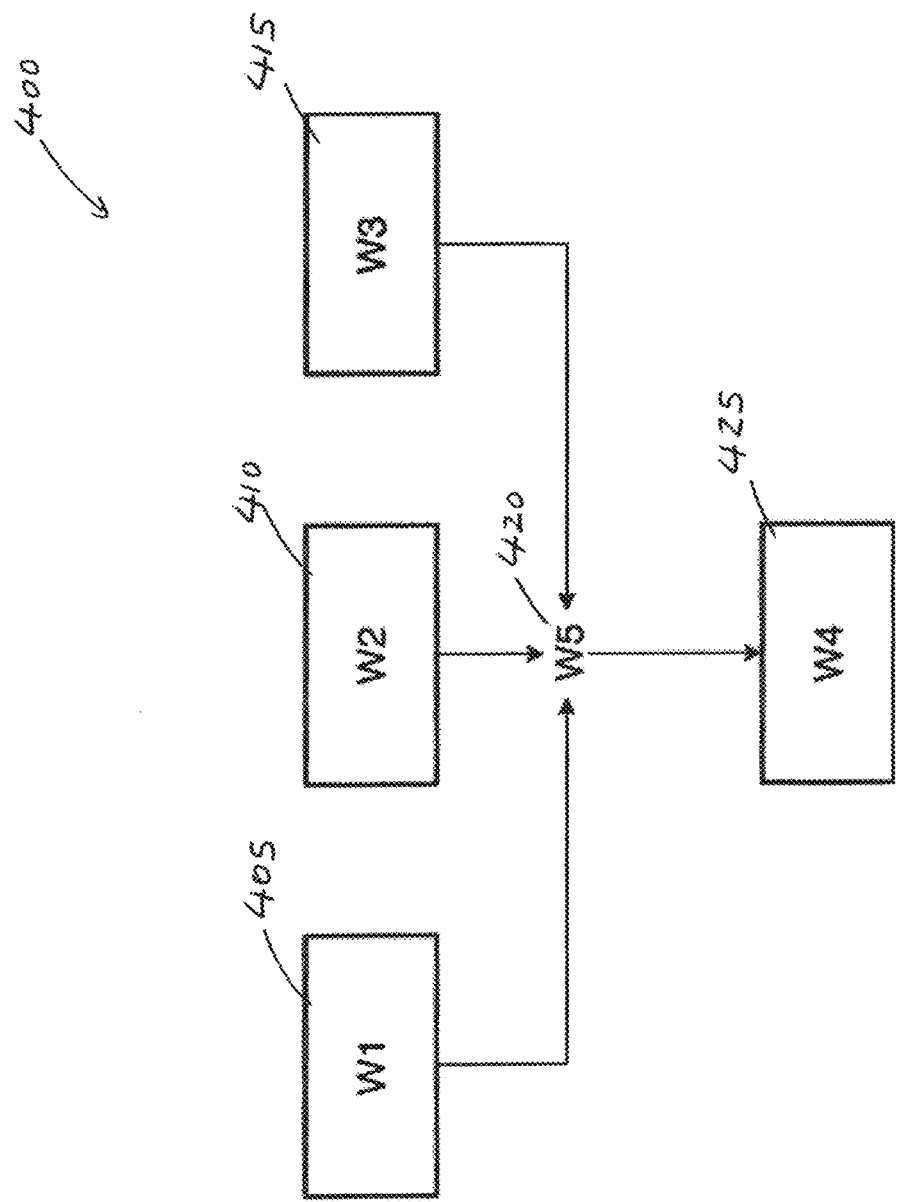

Referring to FIG. 4, illustrating a webhook process flow 400 that can be executable by the content control server system architecture 10 of FIG. 1A in accordance with some embodiments of the invention, the server system 100 can download the supplied metadata and save it to a database or server. For example, item "W1" 405, and/or item "W2" 410, and/or item "W3" 415 can each comprise a social network API. Further, "W4" 425 can comprise a server system 100 database (e.g., database 140). Further, item "W5" 420 can comprise metadata files that are associated with content files that are saved to the server system 100 database or server.

Figures 5, 6:
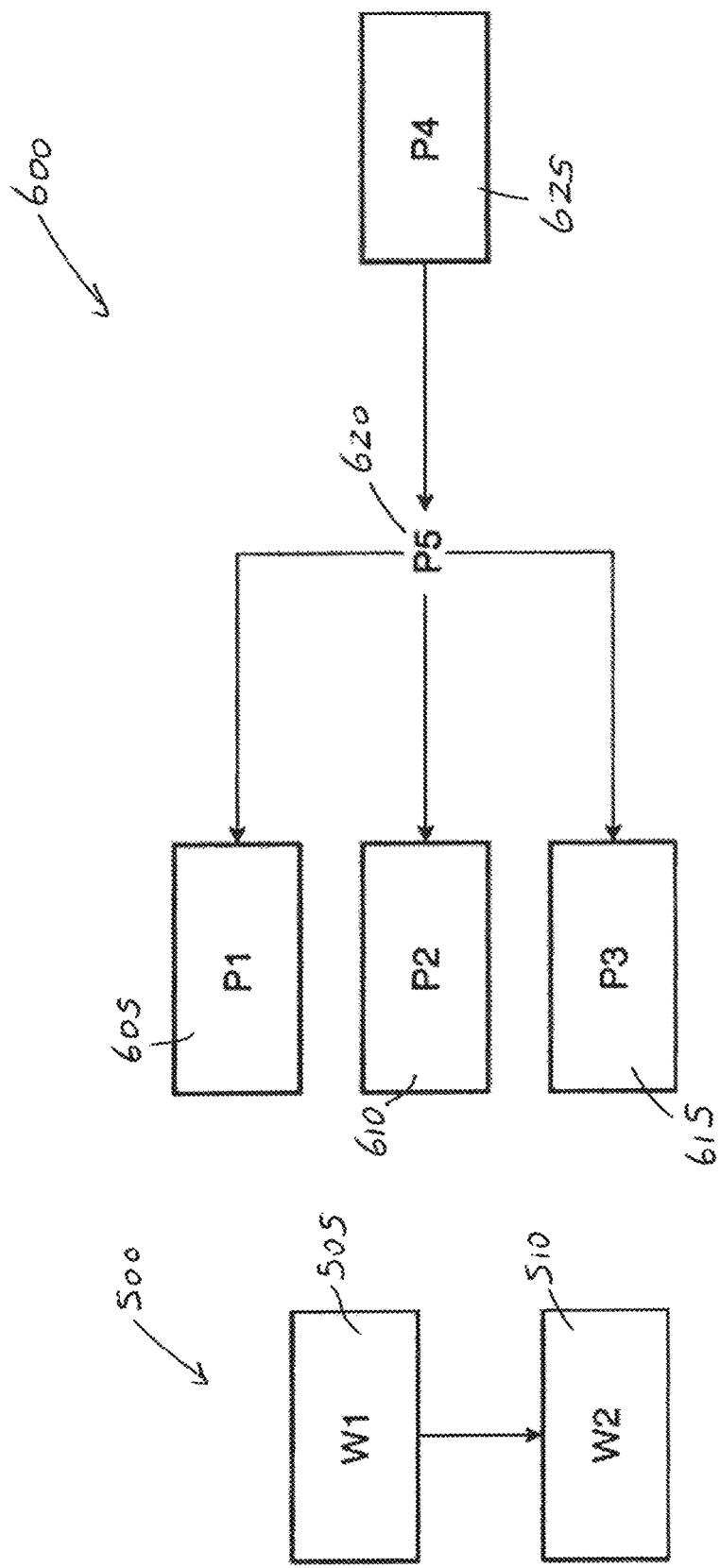
FIG. 6 illustrates a polling process flow in accordance with some embodiments of the invention.

Referring to FIG. 5, illustrating a webhook process flow 500 that can be executable by the content control server system architecture 10 of FIG. 1A, in some embodiments, synchronized content from various social network sources can be displayed to the user 120 in a unified view in a server system 100 platform by the content control server system architecture 10. For example, in this instance, "W1" 505 comprises a list of content with associated metadata from various social networks (e.g., such as social networks 110), and "W2" 510 can be a unified server system 100 dashboard view for display to the user 120 (e.g., by server system 100 on a user's device such as desktop computer 122, and/or mobile computing device 124, or any other conventional device with an Internet browser or other Internet coupling interface or software).

In some embodiments, the server system 100 can utilize polling as a method of synchronizing content. In some embodiments, server system 100 servers can run tasks periodically to check if any content has been uploaded to any social network where the user that has authenticated an API of the server system of FIG. 1A. In some embodiments, when one or more social networks respond with the content available for these users, the server system 100 can save the content to the server system 100 platform. For example, some embodiments include one or more polling steps as follows. In some embodiments, the server system 100 can check one or more social networks 110 periodically for content uploaded to the social networks by users 120. In some further embodiments, the server system 100 can download one or more content files from the social network servers, and save one or more of the files to a server system 100 file storage. In some other embodiments, the server system 100 can download the content metadata from the social network servers, and save one or more metadata files to a server system 100 database 140. In some further embodiments, the synchronized content from various social network sources can be displayed to the user 120 in a unified view on the server system 100 platform.

In some embodiments of the invention, the server system 100 can check the social network 110 periodically for content uploaded to one or more social networks by users 120. One non-limiting embodiment is shown in FIG. 6, illustrating a polling process flow 600 in accordance with some embodiments of the invention. In some embodiments, "P1" 605, "P2" 610, and "P3" 615 can comprise social network servers, "P4" 625 can comprise a server system 100 server, and "P5" can comprise a task that periodically runs on the server system 100 server to query the social networks for content. In some embodiments, the responses from the social networks can specify when a content was uploaded to a server system 100 user's social network account. In some embodiments, the responses for content can contain information about the content. In some embodiments, this can include content metadata and a content URL for the file's location on the social network's server. In some further embodiments of the invention, the polling steps can continue in the same way as in one or more of the webhook processes 300, 400, 500 of FIGS. 3-5.

Some embodiments include a rights synchronization feature. In some embodiments, the server system 100 rights synchronization feature can allow users to set default protection policies to either monetize, permit, and/or block 3rd party uploads of their content across major social platforms. In some embodiments, these default protection policies can be set based on criteria such as social platform, content type, and metadata values. In some embodiments, each time unprotected content is imported through social synchronization, rights synchronization can automatically assert the correct rights and policies on 3rd party platforms before pirates capitalize on a user's content, or monetization opportunities are missed.

In some embodiments, the rights synchronization can also apply a unique identifier to the content on 3rd party platforms so that all earnings from the content monetization can pass into the server system and be automatically paid out to the user. The following describes some non-limiting steps for rights synchronization. In some embodiments, server system 100 user can set their default protection policy. In some further embodiments, server system 100 server can automatically identify protectable content downloaded through social synchronization. In some other embodiments, in a third step, the server system 100 server can send the server system 100 user's content reference files, ownership information, and metadata to all monetizable networks on the server system 100 user's behalf. In some embodiments of the invention, server system 100 can use a combination of secure transfer protocol (SFTP), API, HTTP, FTP, and/or TCP, and/or any other convention transfer protocol to send this information to the social networks. In some embodiments, in a fourth step, a notification can be sent to the server system 100 user, and all relevant parties that have ownership on the content. In some embodiments, rights that are asserted for a server system 100 user's content can be displayed in a unified dashboard for the user to see. In some embodiments, the user 120 can change the asserted rights for any of their content at any time. In some embodiments, steps 3 and 4 can be repeated if any changes are made.

FIG. 7 illustrates an unprotected content process 700 in accordance with some embodiments of the invention. In some embodiments, the server 100 can take unprotected content from social sync "R1" 705, assign default ownership and policies "R2" 710, and save that information in a server system 100 database 715. In some embodiments of the invention, default ownership and policies can be set based on the file and metadata of the synced content. In some embodiments, using the file, the process can take into account file type, length, etc., to set default ownership and policies. In some embodiments, using the metadata, the process can take into account content title, content category, "International Standard Recording Code" (ISRCs), etc., to set default ownership and policies.

In some embodiments of the invention, the server system 100 server can send the user's content to various social networks on the server system 100 user's behalf. For example, FIG. 8 illustrates a content distribution process 800 in accordance with some embodiments of the invention. In some embodiments, "R1" 825 represents the server system 100 server, and "R2" 820 represents the user's unprotected content reference file, metadata, and ownership information. Further, "R3" 805, "R4" 810, and "R5" 815 represent example social networks, where in some cases there can be more or fewer social networks than is shown.

In some embodiments, the server system 100 can assert the rights of the unprotected content on the social networks on the server system 100 user's behalf. For example, FIG. 9 illustrates a rights assertion process 900 in accordance with some embodiments of the invention. In some embodiments, the "R1" 925 represents the server system 100 server, and "R2" 920 represents the user's selected rights being sent to the social network API, conforming to the API standards of each social network, where "R3" 905, "R4" 910, and "R5" 915 represent social network APIs.

Figures 10, 11:
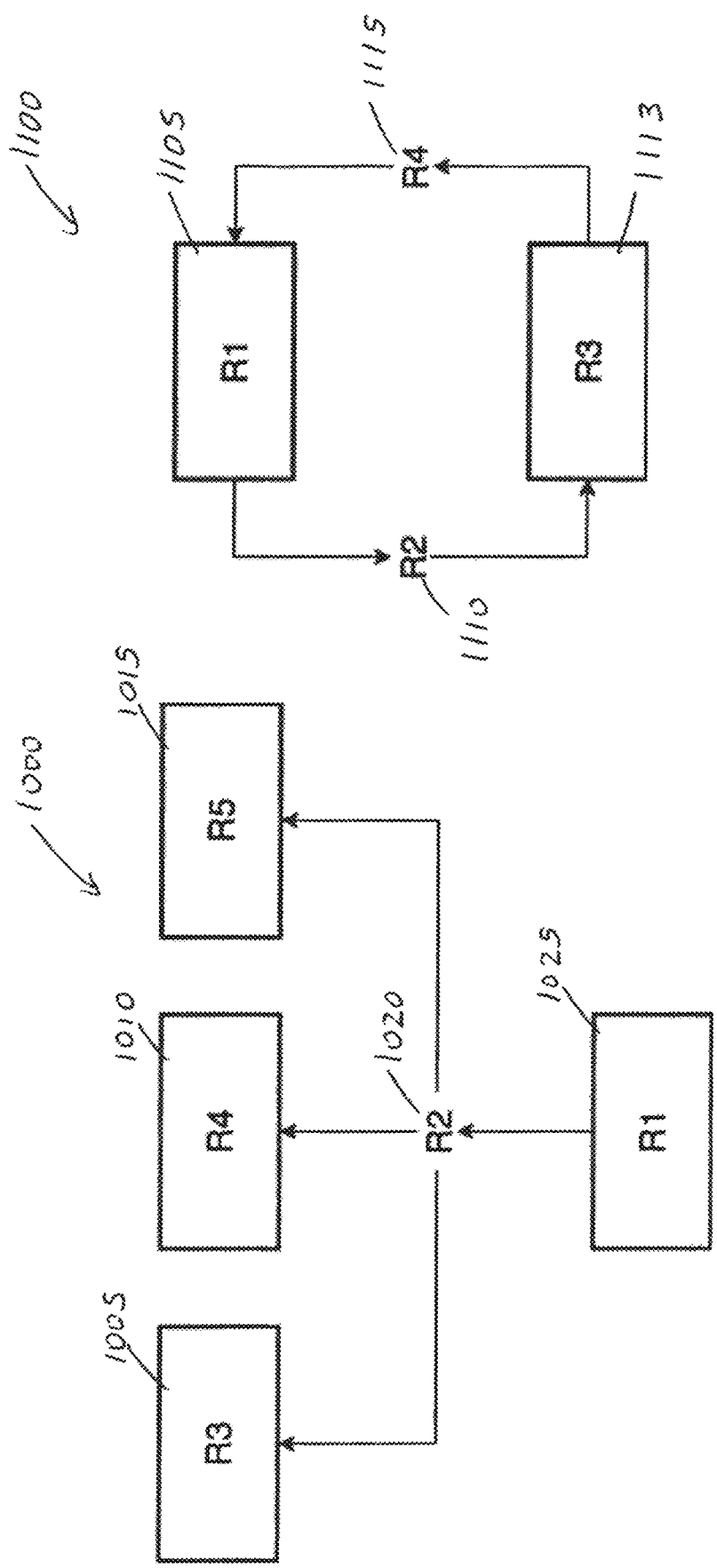
FIG. 10 illustrates an identifier process in accordance with some embodiments of the invention.
FIG. 11 illustrates a rights display and update process in accordance with some embodiments of the invention.

FIG. 10 illustrates an identifier process 1000 in accordance with some embodiments of the invention. In some embodiments, the server system 100 can assign a unique identifier to the content and send that identifier to the social platforms to receive earnings based on that unique identifier. For example, some embodiments include item "R1" server system 100 server, and item "R2" 1020, where server system 100 assigns a unique identifier to the content, where item "R3" can be social network API 1005, item "R4" can be social network API 1010, and item "R5" can be social network API 1015.

In some embodiments of the invention, rights that are asserted for a user's content (e.g., such as those described earlier in relation to FIG. 9) can be displayed in a unified dashboard for the user to see, and the user can change the asserted rights for any of their content at any time. For example, FIG. 11 illustrates a rights display and update process 1100 in accordance with some embodiments of the invention, where "R1" 1105 represents a server system 100 server, "R2" 1110 represents a server system 100 user's protected content, "R3" 1113 represents a server system 100 dashboard view that displays the protected content and current rights that the user asserted on each social network, and "R4" 1115 represents a user who has the option to select new rights for the content and their selection that can be sent to the server system 100 server and reflected in the dashboard view (R3 1113). In some embodiments, if any changes are made during the process 1100 of FIG. 11, the process 900 of FIG. 9 can be repeated.

Figure 12:
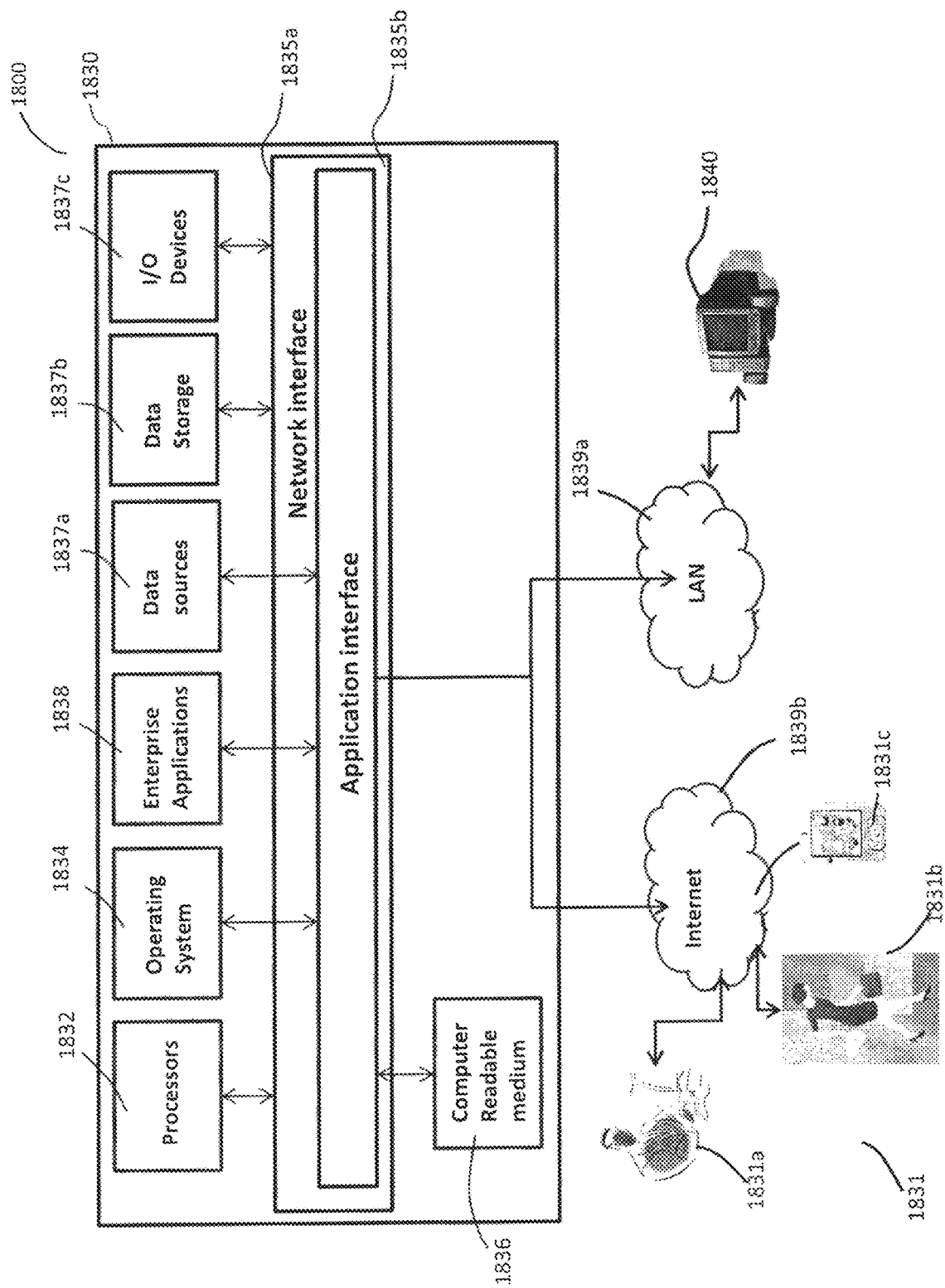
FIG. 12 illustrates a computer server system network of the content control server system of FIG. 1A in accordance with some embodiments of the invention.

FIG. 12 illustrates a computer server system network 1830 of the content control server system architecture 10 of FIG. 1A in accordance with some embodiments of the invention. In some embodiments, the computer server system network 1830 can comprise a computer server system 1830 configured for operating and processing components of the content control server system architecture 10 in accordance with some embodiments of the invention. In some embodiments, the computer system 1830 can process one or more software modules of the aforementioned content control system and method applications, and can be configured to display information related to user content within one or more graphical user interfaces. In some embodiments, the server system 1830 can comprise at least one computing device including at least one processor 1832. In some embodiments, the at least one processor 1832 can include a processor residing in or coupled to one or more server platforms. In some embodiments, the server system 1830 can include a network interface 1835a and an application interface 1835b coupled to the least one processor 1832 capable of processing at least one operating system 1840. Further, in some embodiments, the interfaces 1835a, 1835b coupled to at least one processor 1832 can be configured to process one or more of the software modules (e.g., such as enterprise applications 1838). In some embodiments, the software modules 1838 can include server-based software that can include content control software modules such as a content engine. In some embodiments, the software modules 1838 can operate to host at least one user account and/or at least one client account, and operate to transfer data between one or more of these accounts using the at least one processor 1832, and process any operation of the content control server system architecture 10 described herein.

With the above embodiments in mind, it should be understood that the invention can employ various computer-implemented operations involving content control data stored in computer systems. Moreover, the above-described databases and models throughout the content control can store analytical models and other data on computer-readable storage media within the server system 1830 and on computer-readable storage media coupled to the server system 1830. In addition, the above-described applications of the content control system 10 can be stored on computer-readable storage media within the server system 1830 and on computer-readable storage media coupled to the server system 1830. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the server system 1830 can comprise at least one computer readable medium 1836 coupled to at least one data source 1837a, and/or at least one data storage device 1837b, and/or at least one input/output device 1837c. In some embodiments, the invention can be embodied as computer readable code on a computer readable medium 1836. In some embodiments, the computer readable medium 1836 can be any data storage device that can store data, which can thereafter be read by a computer system (such as the server system 1830). In some embodiments, the computer readable medium 1836 can be any physical or material medium that can be used to tangibly store the desired information or data or instructions and which can be accessed by a computer or processor 1832. In some embodiments, the computer readable medium 1836 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 1836 can transmit or carry instructions to a computer 1840 and/or at least one user 1831, including a router, private or public network, or other transmission device or channel, both wired and wireless. The software modules 1838 can be configured to send and receive data from a database (e.g., from a computer readable medium 1836 including data sources 1837a and data storage 1837b that can comprise a database), and data can be received by the software modules 1838 from at least one other source. In some embodiments, at least one of the software modules 1838 can be configured to output data to at least one user 1831 via at least one graphical user interface rendered on at least one digital display.

In some embodiments of the invention, the computer readable medium 1836 can be distributed over a conventional computer network via the network interface 1835a where the content control system 10 embodied by the computer readable code can be stored and executed in a distributed fashion. For example, in some embodiments, one or more components of the server system 1830 can be coupled to send and/or receive data through a local area network ("LAN") 1839a and/or an Internet coupled network 1839b (e.g., such as a wireless Internet). In some further embodiments, the networks 1839a, 1839b can include wide area networks ("WAN"), direct connections (e.g., through a universal serial bus port), or other forms of computer-readable media 1836, or any combination thereof.

In some embodiments, components of the networks 1839a, 1839b can include any number of user devices such as personal computers including for example desktop computers, and/or laptop computers, or any fixed, generally non-mobile Internet appliances coupled through the LAN 1839a. For example, some embodiments include personal computers 1840a coupled through the LAN 1839a that can be configured for any type of user including an administrator. Other embodiments can include personal computers coupled through network 1839b. In some further embodiments, one or more components of the server system 1830 can be coupled to send or receive data through an Internet network (e.g., such as network 1839b). For example, some embodiments include at least one user 1831 coupled wirelessly and accessing one or more software modules of the content control system 10 including at least one enterprise application 1838 via an input and output ("I/O") device 1837c. In some other embodiments, the server system 1830 can enable at least one user 1831 to be coupled to access enterprise applications 1838 via an I/O device 1837c through LAN 1839a. In some embodiments, the user 1831 can comprise a user 1831a coupled to the server system 1830 using a desktop computer, and/or laptop computers, or any fixed, generally non-mobile Internet appliances coupled through the Internet 1839b. In some further embodiments, the user 1831 can comprise a mobile user 1831b coupled to the server system 1830. In some embodiments, the user 1831b can use any mobile computing device 1831c to wireless coupled to the server system 1830, including, but not limited to, personal digital assistants, and/or cellular phones, mobile phones, or smart phones, and/or pagers, and/or digital tablets, and/or fixed or mobile Internet appliances.

In some embodiments, the server system 1830 can enable one or more users 1831 coupled to receive, analyze, input, modify, create and send data to and from the server system 1830, including to and from one or more enterprise applications 1838 running on the server system 1830. In some embodiments, at least one software application 1838 running on one or more processors 1832 can be configured to be coupled for communication over networks 1839a, 1839b through the Internet 1839b. In some embodiments, one or more wired or wirelessly coupled components of the network 1839a, 1839b can include one or more resources for data storage. For example, this can include any other form of computer readable media in addition to the computer readable media 1836 for storing information, and can include any form of computer readable media for communicating information from one electronic device to another electronic device.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data can be obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and figures herein.

The invention claimed is:

1. A server system comprising:
   at least one processor;
   at least one non-transitory computer-readable storage medium in data communication with the at least one processor, the at least one non-transitory computer-readable storage medium configured to store and exchange content data comprising or representing content derived or received from at least one server of at least one social network and/or at least one user;

an application programming interface in data communication with the at least one processor and the at least one non-transitory computer-readable storage medium, the application programming interface including steps executable by the at least one processor to upload, download, and enable access to the content data derived or received from the at least one server of at least one social network and/or at least one user;

at least one content rights synchronization process configured to enable assignment and control of rights access to any of the content data associated with the at least one user, the assignment and control being based on information associated with a social network that which rights access is being provided and further based on a content type of each of the content included as part of the content data, the assignment and control being modifiable by the at least one user;

a content engine configured to monitor for the content data and save the content data as received content when identified, accessed, and/or received by the at least one social network, wherein the content data comprises content metadata, the saved content data being stored for recall in a centralized library database based on the assignment and control of the rights access;

wherein the system is configured to identify protectable content downloaded through the at least one content rights synchronization process;

wherein upon import of unprotected content data, the at least one content rights synchronization process automatically asserts rights and policies on third party platforms;

wherein the policies determine the actions the actions the third party platforms will take related to a user's copyrighted material; and wherein the actions include permission and/or blocking the third party from uploads of the content.

2. The server system of claim 1, wherein the content comprises at least one of new content data not previously accessed or received by the at least one server, current content of the at least one server, old content previously accessed or received by the at least one server, and archived content.

3. The server system of claim 1, wherein the content comprises at least one of one or more video data files or information, and/or one or more still image data files or information, and/or one or more graphic data files or information, and/or one or more text data files or information, and/or one or more sound data files or information, and/or one or more voice data files or information, and/or one or more control code data files or information.

4. The server system of claim 1, wherein the content engine is configured to automatically copy at least some of the content data to the centralized library database substantially immediately after the content data is posted by the at least one social network and/or at least one user.

5. The server system of claim 4, wherein the copying of at least some of the content data is enabled by the at least one user controlling an opt-in and authorization of the system to access the content data from the at least one social network as part of the rights access.

6. The server system of claim 1, wherein the content engine is configured to copy at least some of the content data by responding to at least one message from the at least one social network.

7. The server system of claim 1, wherein the application programming interface is configured and arranged to be in data communication with the at least one content capturing device.

8. The server system of claim 1, wherein the at least one content capturing device comprises at least one or more cameras or sensors configured for capturing one or more images or video files.

9. The server system of claim 8, wherein the at least one content engine is configured to save the content data following content being identified by the at least one social network with at least one of webhooks and polling.

10. The server system of claim 1, further comprising a web server configured to listen for one or more messages from the at least one social network, the one or more messages specifying when content has been uploaded to at least one social network account of the at least one user.

11. The server system of claim 10, wherein the one or more messages comprise a content uniform resource locator (URL), the web server configured to use the content URL to locate and download the content data from the least one social network.

12. The server system of claim 1, wherein the application programming interface is configured and arranged to provide a unified view of at least some of the content data to the at least one user.

13. The server system of claim 9, wherein the polling comprises the content engine periodically checking for content newly uploaded to the at least one social network.

14. The server system of claim 13, wherein in response to the polling, the at least one social network provides at least one of information about the content data, information about when the content data was posted, content metadata, and a content uniform resource locator (URL).

15. The server system of claim 1, wherein the at least one content rights synchronization process is configured to enable the at least one user to set one or more default protection policies of any content data.

16. The server system of claim 15, wherein the one or more default protection policies comprise policies to at least one of monetize, permit, and block third party uploads of content owned or associated with the at least one user.

17. The server system of claim 1, wherein the at least one content rights synchronization process is configured to apply a unique identifier to content on one or more third party platforms and/or at least one of the social networks enabling earnings from monetization of content associated with the at least one user to pass into the server system and automatically paid to the at least one user.

18. The server system of claim 1, configured to automatically identify protectable content downloaded through social synchronization, and send content reference files, ownership information, and content metadata to all monetizable networks on behalf of the at least one user.

19. The server system of claim 15, wherein the one or more default protection policies of any content data can be set based on the file and metadata of the content data including at least one of file type data, file length data, content title data, content category data, and International Standard Recording Code data.

* * * * *